US007713118B2

(12) United States Patent
Roemer

(10) Patent No.: US 7,713,118 B2
(45) Date of Patent: May 11, 2010

(54) TIMED GAMING EVENT

(76) Inventor: Mickey Roemer, 204 Surtees Point, Las Vegas, NV (US) 89144

( * ) Notice: Subject to any disclaimer, the term of this patent is extended or adjusted under 35 U.S.C. 154(b) by 622 days.

(21) Appl. No.: 11/096,575

(22) Filed: Mar. 31, 2005

(65) Prior Publication Data

US 2006/0019744 A1 Jan. 26, 2006

Related U.S. Application Data

(63) Continuation-in-part of application No. 10/948,372, filed on Sep. 22, 2004, now abandoned, which is a continuation of application No. 10/899,669, filed on Jul. 26, 2004, now Pat. No. 7,347,775.

(51) Int. Cl.
*A63F 13/00* (2006.01)

(52) U.S. Cl. ..................... 463/16; 463/13; 463/25

(58) Field of Classification Search .................. 463/13, 463/16, 25–26; 710/110, 104; 715/212, 715/227

See application file for complete search history.

(56) References Cited

U.S. PATENT DOCUMENTS

| | | | |
|---|---|---|---|
| 5,848,932 | A | 12/1998 | Adams |
| 6,017,033 | A | 1/2000 | Keller |
| 6,159,098 | A | 12/2000 | Slomiany et al. |
| 6,203,429 | B1 | 3/2001 | Demar et al. |
| 6,210,275 | B1 | 4/2001 | Olsen |
| 6,210,277 | B1 | 4/2001 | Stefan |
| 6,224,482 | B1 | 5/2001 | Bennett |
| 6,231,442 | B1 | 5/2001 | Mayeroff |
| 6,231,445 | B1 * | 5/2001 | Acres ........................... 463/42 |
| 6,234,895 | B1 | 5/2001 | Jones et al. |
| 6,238,288 | B1 | 5/2001 | Walker et al. |
| 6,254,481 | B1 | 7/2001 | Jaffe |
| 6,290,600 | B1 | 9/2001 | Glasson |
| 6,309,300 | B1 | 10/2001 | Glavich |
| 6,312,332 | B1 | 11/2001 | Walker |
| 6,312,334 | B1 | 11/2001 | Yoseloff |
| 6,315,664 | B1 | 11/2001 | Baerlocher et al. |
| 6,364,766 | B1 | 4/2002 | Anderson et al. |
| 6,398,218 | B1 | 6/2002 | Vancura |
| 6,413,160 | B1 | 7/2002 | Vancura |
| 6,419,578 | B1 | 7/2002 | Moody et al. |
| 6,439,995 | B1 | 8/2002 | Hughs-Baird et al. |
| 6,443,837 | B1 | 9/2002 | Jaffe et al. |
| 6,481,713 | B2 | 11/2002 | Perrie et al. |
| 6,506,114 | B1 | 1/2003 | Estes et al. |
| 6,520,855 | B2 | 2/2003 | DeMar et al. |
| 6,565,434 | B1 | 5/2003 | Acres |

(Continued)

*Primary Examiner*—Peter DungBa Vo
*Assistant Examiner*—Masud Ahmed
(74) *Attorney, Agent, or Firm*—Weide & Miller, Ltd.

(57) ABSTRACT

A timed gaming event has a start time, a defined duration, and an end time. In one embodiment, the timed gaming event comprises a period of time during which the payout for winning results is enhanced, such as by a multiplier. In another embodiment, the timed event is a tournament in which players of multiple gaming machines play a plurality of games. The winner(s) of the tournament is determined by the aggregate outcomes of each player's play of the multiple games during the event, such as the player having the highest aggregated winnings for games played during the event. Another event is a timed bonus period of a main game, during which a player is provided the opportunity to play a bonus game for enhanced winnings.

13 Claims, 7 Drawing Sheets

U.S. PATENT DOCUMENTS

| | | | | |
|---|---|---|---|---|
| 6,752,717 | B2 | 6/2004 | Vancura | |
| 6,837,793 | B2 | 1/2005 | McClintic | |
| 2003/0060258 | A1 | 3/2003 | Coleman et al. | |
| 2003/0062680 | A1 | 4/2003 | Seelig et al. | |
| 2003/0064768 | A1 | 4/2003 | Fier | |
| 2004/0102238 | A1 * | 5/2004 | Taylor | 463/16 |
| 2004/0235554 | A1 | 11/2004 | DeFrees-Parrott et al. | |
| 2005/0014547 | A1 * | 1/2005 | Gomez et al. | 463/16 |
| 2005/0124402 | A1 * | 6/2005 | Miller | 463/13 |

* cited by examiner

TIMED GAMING EVENT

RELATED APPLICATION DATA

This application is a continuation-in-part of U.S. application Ser. No. 10/948,372 filed Sep. 22, 2004 now abandoned, which is a continuation of U.S. application Ser. No. 10/899,669 filed Jul. 26, 2004 now U.S. Pat. No. 7,347,775.

FIELD OF THE INVENTION

The present invention relates to gaming machines and methods of playing games.

BACKGROUND OF THE INVENTION

Gaming continues to grow in popularity and is spreading geographically and demographically. As gaming grows, so does the player's desire for new and exciting games.

A variety of games have been developed recently which include new features designed to add excitement to the game play. These games and gaming machines suffer from a number of drawbacks.

First, a number of games presently offer "bonus" events. These events, however, are generally very static events which are not very exciting. For example, in the play of some slot-type games, if the player receives a certain combination of symbols, a circular wheel printed with bonus values may spin and stop, yielding the player with a bonus pay. These types of bonus events have become common-place, and do not include any player participation.

Second, most machine-presented casino games suffer from the problem that they are single player games. Thus, some players like to play games such as poker and bingo where multiple players are involved. Otherwise, when playing a gaming machine, the game play experience is very isolated.

The present invention is a gaming machine, system and method of game play which has numerous advantages over the prior art games and gaming devices.

SUMMARY OF THE INVENTION

The invention comprises methods of playing/presenting one or more games, gaming machines for presenting games, and gaming systems including gaming machines. Preferably, the games are played as wager type games, with the opportunity for monetary awards for winning results.

One embodiment of the invention is a method of presenting and playing a game. In one embodiment the game is, or includes, a timed gaming event. Preferably, the event has a start time and an end time. The duration of the timed event is preferably determined independent of game play, such as by being randomly selected or generated. The start of the event may be displayed or announced to the player or players of gaming machines. The timing remaining in the event may also be displayed, such as with a timer, clock or the like.

Preferably, games of the invention are presented to a player at a gaming machine. In one embodiment, the games are "wager" type games providing the opportunity for a player to receive monetary winnings or representations thereof. The timed gaming events are preferably associated or enabled at one or more of such gaming machines.

One embodiment of the invention is a method of playing a game including a timed bonus event. In accordance with the invention, a player of a base game may be provided the opportunity to play a bonus event, such as one or more bonus games, for a time period. For example, if a player receives a particular outcome while playing a base game, such as a particular combination of symbols playing a slot game, then the player may be provided the opportunity to play a bonus event for a period of time. In one embodiment, the bonus event may comprise a plurality of individual games, each providing the opportunity for a winning or losing outcome. A player plays as many bonus games as possible during the bonus time period, and is preferably rewarded winnings for the winning outcomes of the bonus games played during the timed bonus event.

In another embodiment, the timed gaming event may comprise a period of time during which enhanced payouts for winning game outcomes are awarded. For example, during a period of time having a start and an end, a player of a gaming machine may be provided the opportunity to be paid a multiplier, such as 2× or 3×, of the payout for each winning outcome received for games played at the gaming machine during the timed event.

Another embodiment of the invention is a timed tournament event. Preferably, players of a plurality of gaming machines play multiple games during a defined period of time. The outcomes of each player's games during the period of time are aggregated to define that player's tournament result. Preferably, the tournament outcome is determined from each player's tournament result. For example, the winner of the tournament may be deemed to be the player having the highest aggregate winnings for all games played during the tournament.

The timed gaming events may comprise base games, bonus games or portions of games or aggregations of games. The timed gaming events may require players to place wagers or may allow players to play for free or for no additional wager. The timed gaming events may involve a single player and/or gaming machine, or multiple players and multiple gaming machines.

Further objects, features, and advantages of the present invention over the prior art will become apparent from the detailed description of the drawings which follows, when considered with the attached figures.

DETAILED DESCRIPTION OF THE INVENTION

The invention includes gaming devices, systems including one or more gaming devices, and methods of playing a game.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises gaming machines configured to present a game, one or more games or events, and one or more systems including gaming machines and data. Preferably, gaming machines include a telecommunication device, allowing calls to be placed to the player of a game and/or to a third-party participant located remote from the gaming machine.

One embodiment of the invention is a method of presenting and/or playing a game. Preferably, the game is presented on or by a gaming machine. One embodiment of the invention is a gaming machine which is particularly configured to present the game(s) of the invention.

Figure 1:
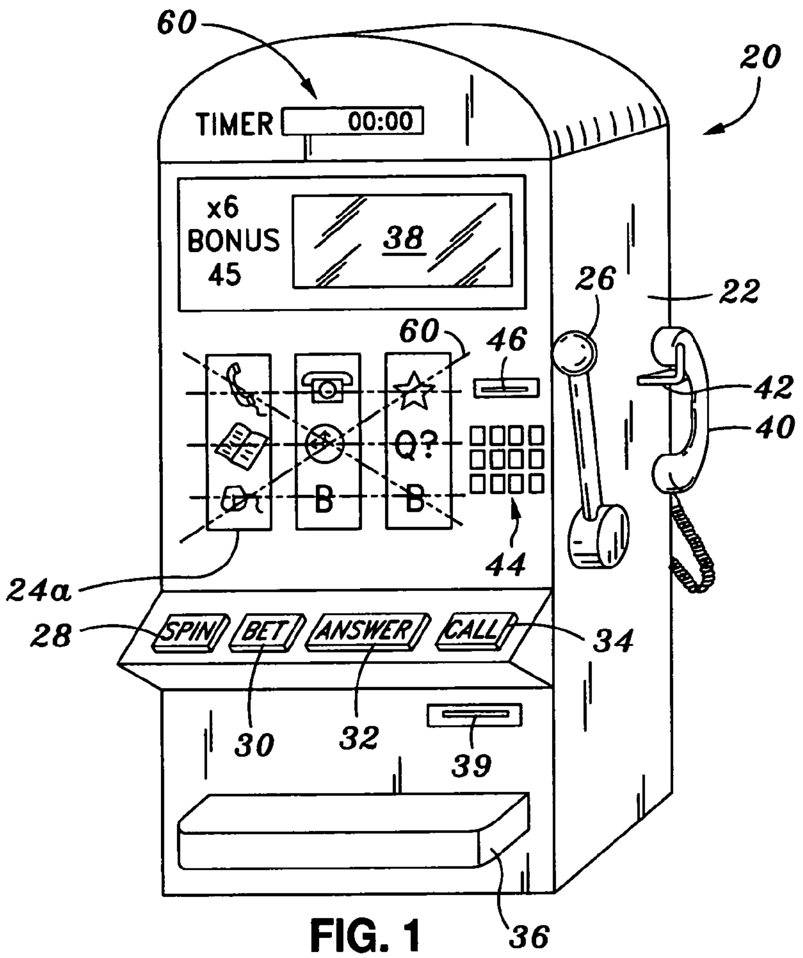
FIG. 1 is a perspective view of a gaming machine in accordance with one embodiment of the invention.

Referring to FIG. 1, a gaming device or machine 20 includes a housing 22 containing or supporting various components. The gaming machine or device 20 is, either alone or in combination with other devices, preferably configured to present a game, such as a game of the invention. It will be appreciated that the housing 22 may have a variety of shapes and configurations. For example, the gaming machine 20 may be configured as an "upright", "bar-top" or "slant" style gaming machine, which configurations are well known in the industry.

As illustrated, the gaming machine 20 includes means for displaying symbols or indicia utilized in the play or presentation of a game. In a preferred embodiment, the gaming machine 20 includes three mechanical reels 24*a,b,c*. In a preferred embodiment, the reels 24*a,b,c* are utilized to present or play a base or main game or event, and as such are referred to generally herein as "main game" reels.

Such reels 24*a,b,c* are well known, and comprise a body having one or more indicia or symbols printed thereon. The reels 24*a,b,c* may have a number of positions or locations which bear or do not bear (i.e. comprise a "blank" position) indicia. The indicia or symbols which are borne by the reels 24*a,b,c* may vary. Preferred examples of symbols for use in playing games of the invention are described in detail below.

The various combinations of indicia displayed by the reels 24*a,b,c* preferably have significance to or relate to the outcome of a game presented at the machine 20. For example, certain combinations of indicia may comprise a non-winning combination. Preferably, one or more combinations of the indicia when displayed as a result of a spin of the reels 24*a,b,c* are designated as a winning combination of indicia. The number of winning combinations may vary dependent upon the desired payout or winning percentage to the players as compared to that which is retained by the game operator. In one or more embodiments, at least one of the same indicia is contained on each of the reels 24*a,b,c*, and at least one winning combination comprises all of the reels 24*a,b,c* displaying that same indicia.

Means are provided for rotating the reels 24*a,b,c*. In one or more embodiments, the means may comprise a mechanical linkage associated with a spin arm 26, with movement of the spin arm (a "pull") by a user causing the reels 24*a,b,c* to spin. In such an arrangement, the reels 24*a,b,c* are generally allowed to free-wheel and then stop. In another embodiment, electronically controlled mechanisms are arranged to rotate and stop each reel 24*a,b,c*. Such mechanisms are well known to those of skill in the art. In this arrangement, actuation of the spin arm 26 or depression of a spin button 28 causes a controller (not shown) to signal the activation of the spin mechanism associated with one or more of the reels 24,*a,b,c*. Preferably, the controller is arranged to either turn off the signal to the device(s) effecting the rotation of each or all of the reels 24*a,b,c*, or generates a signal for activating a braking device, whereby the reels 24*a,b,c* are stopped. As is well known, the combinations of reel positions and their odds of hitting are associated with the controller, and the controller is arranged to stop the reels 24*a,b,c*, in a position displaying a combination of indicia as determined by the controller based on the combinations and odds. The principal of such an arrangement is described in U.S. Pat. No. 4,448,419 to Telnaes, which is incorporated herein by reference.

The gaming machine 20 preferably includes one or more player inputs which permit the player to interact with the gaming machine 20. In the embodiment illustrated, the gaming machine 20 includes a plurality of push-buttons. As described above, one such button may comprise a "spin" button 28. As also illustrated, buttons or similar input devices may include a "bet" button 30, "answer" button 32, and "call" button 34.

A wide variety of other inputs may be provided, varying both in form and function. For example, in one embodiment, one input may comprise a "touch screen" type display. Other inputs, such as rotatable arms, joysticks, keyboards or keypads, or other inputs may be provided. Each input preferably provides input, such as by way of an electrical signal, to the gaming controller or other game content generating device. In that manner, game play is interactive.

In one embodiment, the gaming machine 20 is configured to present a game only upon a player placing a bet, wager, or other payment. Thus, the gaming machine 20 may include means for accepting value, and preferably, monetary value. As illustrated, the gaming machine 20 may include a coin acceptor (not shown). The coin acceptor may be configured to accept coins of one or more denominations. A coin sorter, coin hopper and other coin holding and processing devices may be located in the housing 22 of the gaming machine 20.

The gaming machine 20 may also or alternatively include a bill validator (not shown). The bill validator may be configured to accept paper money of one or more denominations. A bill stacker and other bill processing and storage devices may be located in the housing 22 of the gaming machine 20.

The gaming machine 20 may also or alternatively include a ticket reader, smart card, credit card or other media acceptor/reader. Such devices may be utilized to obtain information regarding value, such as credit card account information or bar-coded ticket value.

When value is provided to the gaming machine 20, the gaming machine 20 may be configured to display information regarding the provided value, such as in the form of "credit" information. This information may be displayed, for example, on a display of the gaming machine or one associated therewith.

The player may utilize inputs to place a wager, bet or provide payment to play a game. For example, a player may depress the "bet" button 30 to bet or wager one or more credits.

In one embodiment, the gaming machine 20 is configured to award winnings for winning outcomes of games played. The winnings may be paid or provided to the player in a variety of manners. In one embodiment, awards may be indicated in the form of credits. Thus, when a player wins, the total number of credits belonging to them is increased, and the increased amount may be displayed to the player. The player may utilize the awarded credits to play future games.

In another embodiment, the player may be awarded money, or may convert credits to money. As illustrated, the gaming machine 20 may include a coin tray 36 into which coins may be dispensed. The coins may represent a specific award. Alternatively, the player may utilize a "cash out" button or input (not shown) and be paid the value of their credits in the form of coins.

Other forms of payment may be provided, such as by issuance of a ticket which represents value. As illustrated, the gaming machine 20 includes a ticket printer 39 for printing and dispensing a medium bearing information regarding value.

Non-monetary prizes may also be awarded. For example, credits may be redeemed for prizes or a ticket or tickets may be redeemed for specific prizes or general prizes. In other embodiments, game play may be for entertainment purposes only and no prize or award may be won or awarded. In one embodiment, a player may win points which the player can accrue and use, such as for free game play. In another embodiment, no payment need be provided. For example, the game may be played for recreational purposes only. In other embodiments, points may be awarded, the points having no "value," except to provide the player an indication of the level of success of play of the game. Such a level of points may be compared, for example, to the level of points achieved by other players.

It will be appreciated that instead of mechanical reels 24*a, b,c*, other means may be utilized to display symbols, indicia or other information regarding play of the main game. For example, such indicia could be displayed by a video display. The display may be of a variety of types now known or later developed, such as DLP, CRT, plasma, LCD or others.

In a preferred embodiment of the invention, the gaming machine 20 includes a second means for displaying symbols or indicia. In one embodiment, this means comprises a video display 38. As described above, such a display may be of a variety of types now known or later developed. In general, the display 38 is configured to present information for viewing by a player of the gaming machine 20. The second means might also include additional reels.

Preferably, means are provided for controlling the operation of the gaming machine 20, such as the reels 24*a,b,c* and the display 38. In one embodiment, that means comprises a gaming controller. The gaming controller may be configured to track game credits (including value provided to the gaming machine and bets placed), initiate the rotation and stopping the reels 24*a,b,c*, and, as detailed below, initiate bonus events including generating information for display by the display 38. In one embodiment, a gaming controller includes a processor and a memory. The memory stores software which is executed by the processor. In one embodiment, the gaming controller is located inside of the housing 22 of the gaming machine 20.

In another embodiment, the operation of the gaming machine 20 may be controlled in whole or in part from a remote location, such as a remote server. For example, game data may be generated remotely and be transmitted to the gaming machine 20 for display. The game data may then be downloaded to the gaming machine 20 via a wired or wireless communication link.

In one embodiment, the gaming machine 20 includes a telecommunication device comprising a transceiver and a handset 40. Preferably, the handset 40 includes a microphone configured to accept audio input from the player and a speaker for presenting audio output to a player. The handset 40 may be of a variety of forms. As illustrated, it comprises a physical element. In other embodiments, it may comprise one or elements of the gaming machine 20 and be integrated into the machine. For example, the speaker may comprise a speaker which is used to generate other audio information at the gaming machine.

As is known in the art of telephones, in an embodiment where the handset 40 is a physical device, the handset 40 may be mounted on an actuatable hook 42. Removal of the handset 40 from the hook 42 may close a circuit, thus establishing a communication link to the handset 40 (as in the case of an incoming call) or establish a link with a remote location (as in the case of an outgoing call). As illustrated, "answer" and "call" buttons 32,34 may be utilized for similar purposes. The use of the handset 40 or buttons 32,34 is described in more detail below.

The telecommunication device may have other forms. For example, the speaker and receiver of the handset may be built into the machine itself. The device might also include a wireless handset.

In one embodiment, the gaming machine 20 also includes an input in the form of a keypad 44. The keypad 44 is configured to accept input from a player, such as numbers, letters or a combination thereof. In one embodiment, the keypad 44 permits the input of the numbers 1, 2, 3, 4, 5, 6, 7, 8, 9, and 0, as well as the symbols # and *, in similar fashion to the keypad of a touch-type telephone.

This same keypad 44 may be associated with a card reader 46, such as a card reader of a player tracking system. As is well known, in such a system, a player may identify themselves (such as by input of a card bearing information). Awards may be provided to the player associated with their play.

The gaming machine 20 illustrated and described is just one embodiment of a device which may be used to present a game in accordance with the invention. Other devices may be utilized. For example, the gaming machine 20 may also comprise a computing device, such as a laptop or desktop computer. Game information may be transmitted via a communication link to a remote player. The communication link may include, for example, the Internet. The game information may be utilized by the remote player's computer, such as by displaying game information on an associated screen. A player may provide input via a keyboard, mouse or other input device.

Various aspects of the games of the invention may be presented at other than a gaming machine. For example, as described below, various features of the invention may be implemented in conjunction with a table game.

Figure 2:
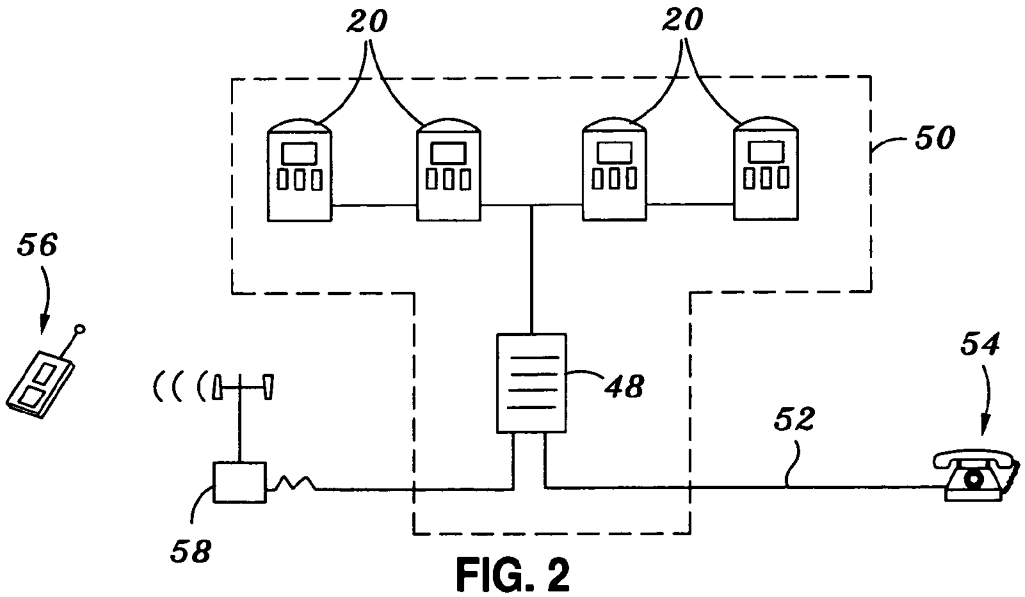
FIG. 2 is a diagram illustrating one embodiment of a gaming system in accordance with an embodiment of the invention.

Preferably, the gaming machine 20 is configured to establish a telecommunication link to the player of the game and/or from the player at the gaming machine to a remote location. In one embodiment, a telecommunication link may be established directly to the gaming machine 20 from a remote location, such as a telephone exchange, in similar fashion to a telephone in a home. Referring to FIG. 2, in one embodiment, a plurality of gaming machines 20 are all associated with one or more common devices.

In one embodiment, a telecommunication link exists between the gaming machine 20 and a central location, such as server 48. The gaming machines 20 and server 48 may comprise a gaming system 50, such as operated by a casino.

The server 50 may have a variety of configurations and may comprise a single device or a group of devices. In one embodiment, the server 50 comprises a computing device including a processor, a memory for storing data, and at least one transceiver. The transceiver comprises a communication interface for accepting information from, or transmitting information to, the various gaming machines 20.

In one embodiment, the server 50 acts as a telecommunication controller, routing calls from remote locations to appropriate machines 20, or routing calls from machines 20 to outbound destinations. For example, in one embodiment, a phone number (or other unique identifier) is assigned to each gaming machine 20. Callers may attempt to call a player of a gaming machine 20 using the telephone number assigned to the machine 20. Such calls may be placed remotely and routed by the server 50 to the appropriate machine.

Similarly, calls may be routed through the server 50 to outbound locations, such as a local exchange. For example, as illustrated, a communication link 52 may be established between the gaming machine 20 and a remote telephone 54 via a wired telecommunication link. In addition, a link may be established with a wireless telephone 56, such as via one or more cellular, satellite or other links 58.

Of course, the server 50 (or other servers 50) may be configured to perform a variety of tasks. For example, the server 50 may store player information and game play information, as known in the art of player tracking systems. In this regard, the server 50 may obtain information from the gaming machines 20 to track game play. The server 50 may also, as indicated above, generate game content for use by the gaming machine 20.

In one embodiment, a communication link is provided between each gaming machine 20 and the server 50. The links may be dedicated or shared. Further, multiple links may be provided for different purposes. For example, one link may be utilized to transmit player tracking/game play information. Another link may be utilized for the telecommunications. Yet another link might be utilized to transmit game information, such as where the game is controlled by the server.

The various links between the gaming machines 20 and the server 50 may be wired or wireless or combinations thereof. Communications may be effected using a variety of hardware and software, and in accordance with a number of standards, such as IEEE-1394, IEEE802.xx or the like.

Figure 3:
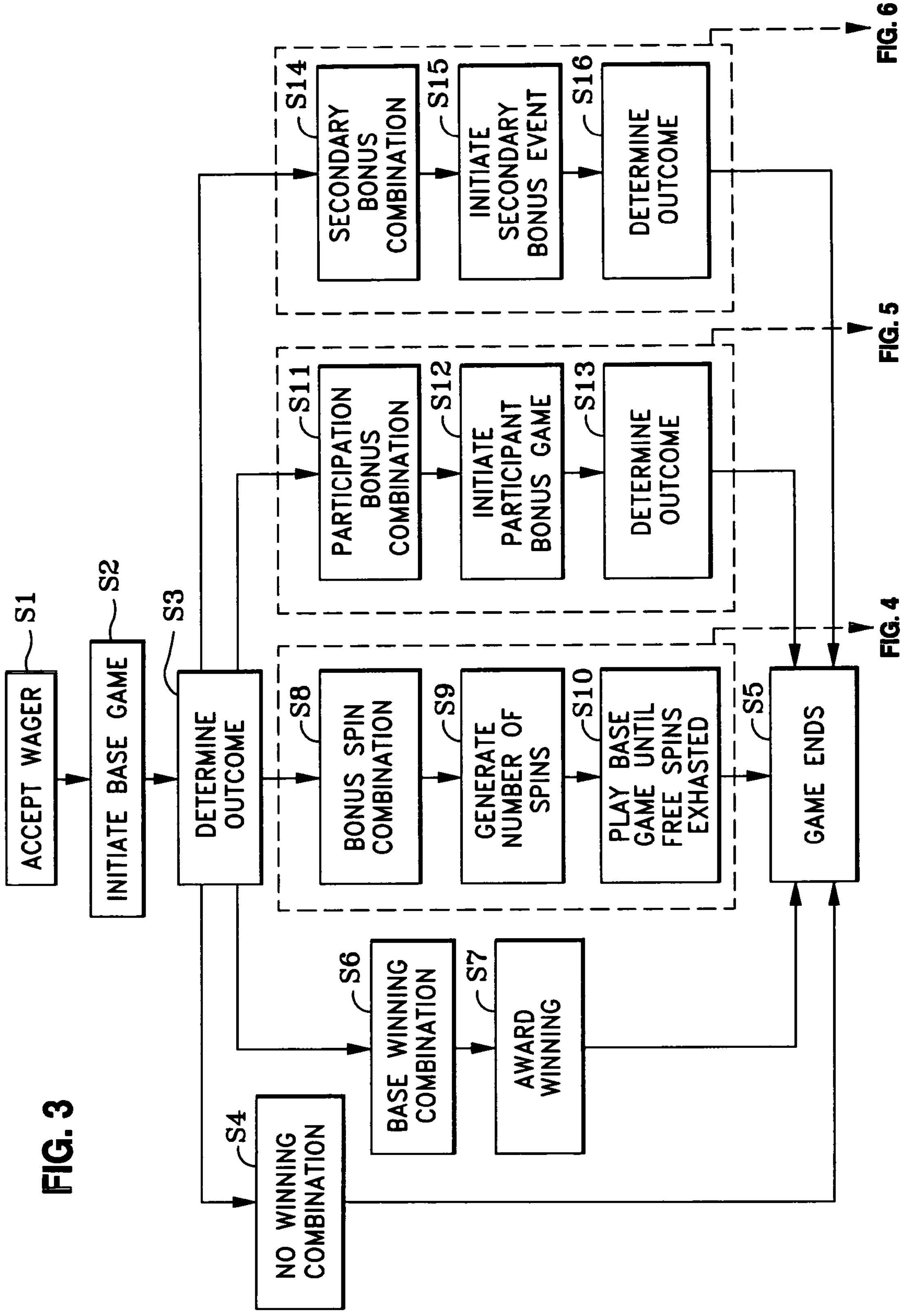
FIG. 3 is a flow-chart illustrating one embodiment of a method of playing a game in accordance with an embodiment of the invention.

One embodiment of a game of the invention will now be described with reference to FIG. 3. In a preferred embodiment, a game is presented as a wagering game. In such a configuration, a player wagers value for the opportunity to be awarded winnings. Of course, the game, or at least portions thereof, may be played for entertainment only, with the player not require to wager value.

In the wager format, as illustrated, in a step S1 the player places, and the gaming machine accepts, a wager. As described above, if the wager is in the form of monetary value, the wager may be placed in a variety of fashions. In one embodiment, a player inputs currency, coins or a medium representing or associated with such value, such as a coded ticket, credit/debit card or the like. The value may be credit to the machine 20, the player then placing a wager specifically for a game using the "bet" button 30. In that case, the number of credits belonging to the player is reduced by the amount of the bet.

In response to the wager, the game is then presented. In one embodiment, this step comprises the gaming machine 20 presenting a base game. In one embodiment, this game comprises the random selection of indicia, one or more of which, alone or in combination, comprise winning or losing game results. In the case of the gaming machine 20 described above, the base game comprises the rotation of the reels 24*a,b,c* to a stopped position in which they display a set of symbols or indicia. This set of indicia represents the outcome of the base game.

In one embodiment, if the indicia which appear in specific locations, such as along a payline 60, comprise a wining indicia or winning combination of indicia, then in a winning outcome is declared. As indicated below, there may be a number of winning combinations, one or more of which trigger different outcomes or results.

In the embodiment illustrated, the game is presented on three reels 24*a,b,c*, each configured to display at least three symbols. There may be as few as one or multiple paylines. In the configuration illustrated, five paylines are illustrated.

In one configuration, the number of paylines which are activated is dependent upon the size of the player's wager. For example, if the player places a wager of a single amount, such as a single coin or credit, then a single payline may be activated. In that instance, only indicia appearing along that single payline are considered in determining the outcome of the game. Additional coins or credits wagered may activate additional paylines. A maximum bet, such as five coins or credits, may activate all of the paylines.

In one embodiment, symbols on reels are selected from one or more of the following:

TABLE 1

| | |
|---|---|
| A. | Dialing For Dollars logo |
| B. | Dialing For Dollars "Bonus Round" symbol |
| C. | Slot-A-Thon logo |
| D. | Slot Machine with TV type antennae coming out of the top |
| E. | Cellular phone |
| F. | Old style phone |
| G. | Modern phone |
| H. | Telephone variation #4 |
| I. | Telephone variation #5 |
| J. | Address Book |
| K. | Telephone Book |
| L. | Stop watch symbol |
| M. | "Make A Call" icon |
| N. | Phone booth or pay phone |
| O. | 911 symbol |
| P. | Operator |
| Q. | Phone card icon |
| R. | Prank call icon |
| S. | Can and a string symbol |
| T. | Wild symbol |
| U. | Multiplier type symbols |
| V. | Phone friends |
| W. | Slot-A-Thon bonus symbol |
| X. | Qualifier question symbol |

Preferably, of course, the symbol or symbols which comprise winning and losing combinations are known before the game begins.

In a step S3, the outcome of the base game is determined. In one embodiment, this comprises determining if the symbol or symbols along one more paylines are winning or losing combinations. As described above, in one embodiment, the outcome of the base game is known when the game is initiated, (such as by random generation of a number by the gaming controller (or a random number generator associated therewith), that number corresponding to a particular possible outcome), and before the reels are rotated or before they stop. In this configuration, the outcome of the game is known even before the reels stop spinning, and actually, the stopping position of the reels is determined by the then known outcome of the game.

The game may have a number of outcomes. As described below, in one embodiment, there are five possible outcomes. Of course, the game may be played with varying types and numbers of possible outcomes.

In one embodiment, it may be determined that the outcome is no winning symbol or combination of symbols (such as along an active payline), as in a step S4. In such event, the game may end, as in step S5. In a preferred embodiment, if there is no winning combination, the player loses their wager and they are paid no winnings.

In one embodiment, as in step S6, it may be determined that the outcome of the game is a particular winning symbol or combination of symbols comprising a base win. For example, one or more symbols or combinations of symbols may comprise a winning result which entitles the player to a winning. In such event, as in step S7, the player may be awarded a winning. The winning may be awarded in a variety of ways and may comprise a number of things.

In one embodiment, the winning comprises monetary value. The size of the winning may depend upon the size of the player's wager and/or the probable frequency of receiving the particular winning combinations, among other factors. In one embodiment, the winning is awarded to the player in the form of credits. The player may elect to "cash out" those credits from the machine, such as by requesting that a value ticket be printed by the printer 39, or by dispensing coins to the coin tray 36, among other ways. After the player is paid their winnings, the game preferably ends at step S5.

In one embodiment, as in step S8, it may be determined that the outcome of the game is a particular winning symbol or combination of symbols entitling the player to additional game play. In a preferred embodiment, the additional game play is offered to the player without additional wager.

Aspects of one embodiment of such a game are described in greater detail below in conjunction with FIG. 4. In one embodiment, as in step S9, the player is awarded the opportunity for a number of free game spins. The outcome of those games is determined and play continues until all of the free spins and associated events are completed, as in step S10. Of course, the result of those games may vary, and may include winning outcomes for which the player is awarded winnings. The game then ends at step S5.

In one embodiment, as in step S11, it may be determined that the outcome of the game is a particular winning symbol or combination of symbols entitling the player to play a participant game. Aspects of one embodiment of such a game are described in greater detail below in conjunction with FIG. 5. In one embodiment, as in step S12, the bonus game is initiated. In step S13, the outcome of that game is determined. The outcome may be a winning or losing outcome, and may include awarding the player and/or third party participant winnings. In step S5, the game then ends.

In one embodiment, as in step S14, it may be determined that the outcome of the game is a particular winning symbol or combination of symbols entitling the player to play a bonus event. Aspects of one embodiment of such a game are described in greater detail below in conjunction with FIG. 6. In one embodiment, as in a step S15, the bonus event is initiated or presented. In step S16, the outcome of that event is determined. The outcome may be a winning or losing outcome, and may include awarding the player winnings. In a step S5, the game then ends.

A free spin bonus in accordance with the invention will now be described in conjunction with FIG. 4. As indicated above, such a bonus event may be initiated based upon a player receiving a particular symbol or combination of symbols, as in step S8 of the method of game play illustrated in FIG. 3.

In one embodiment, the free spin bonus offers the player the opportunity to win a number of free spins. The number of free spins awarded may vary, and may be as few as zero, but is preferably at least one and more preferably 5 to 25.

In one embodiment, this bonus event includes the step of determining the number of free spin games which the player is entitled to play, and then permitting the player to play those games. Referring to FIG. 4, in a step S100, a call is initiated to the player. In the case of the gaming machine 20 illustrated in FIG. 1, this step preferably comprises calling the player via the handset 40.

The call may be initiated in a variety of ways. In a preferred embodiment, the controller of the gaming machine initiates the call, causing the player to be notified of an incoming call. This may include dissemination of an audible "ring," as is well known in the art of telephones. This may also include the display of information to the player, such as the display of a telephone and text indicating the player has an incoming call (such as displayed on display 38 of the gaming machine 20).

The player is provided the opportunity to answer the phone/take the call. In the configuration of the gaming machine 20 illustrated in FIG. 1, the player may answer the call by lifting the handset 40. Alternatively, the player may answer the call by pressing the "answer" button 32. Of course, the ways the player may take the call/answer the phone may depend upon the configuration of the gaming machine.

In one embodiment, a value is determined by how and when the call is answered. In one embodiment, in a step S101, the player may answer the call. Preferably, the longer the player waits to answer the call, the greater the value which is assigned. In a step S102, a multiplier value is set to the number of rings before the player answered the call. For example, the controller of the gaming machine may cause a ring to be generated at spaced intervals of 2 seconds. Once the player answers the call, the rings stop, and a multiplier is assign a value equal to the number of rings which were presented before the player answered the call. In other embodiments, the value could be a multiple of the number of rings, or the like.

In a step S103, the machine may answer the call automatically. In one embodiment, the gaming controller is configured to answer the call after a period of time if the player has not answered the call. In a step S104, in such event, a multiplier value is then generated or selected. The multiplier value may be selected randomly from a set of values. Preferably, the multiplier values which may be selected and assigned by the machine are less than that which the player has an opportunity to win. In one embodiment, the machine assigns a fixed multiplier of 2 for every event.

In this manner, the player must determine whether they wish to attempt to wait for additional rings in an attempt to obtain a higher multiplier, in light of the risk of the machine answering and assigning a lower multiplier. For example, a player who has waited three rings may be entitled to a multiplier of 3. If the player waits for a fourth ring before answering, the player may either obtain the ring and then a multiplier of 4, or the machine may answer, causing the player's multiplier to be reduced to 2.

Next, a number of free spins are awarded, in step S105. In one embodiment, the gaming controller makes a selection of an outcome from possible selections. That selection is then transmitted to the player. In a preferred embodiment, the transmission of the selection is in the form of the call to the player. Preferably, the selection is presented in audible form to the player. Examples of possible calls and numbers of free spins assigned thereto are set forth below:

TABLE 2

| | |
|---|---|
| 1. | Wrong number - 5 free games |
| 2. | I'll be late for dinner - 10 free games |
| 3. | Your mother - 10 free games plus 2× more multiplier |
| 4. | Best friend with gossip - 15 free games |
| 5. | Radio Station promotion - 5 free games |
| 6. | Prank call - 2 free games |

Now, the player is preferably provided the opportunity to play the games, as in step S106. As indicated, these games are preferably presented to the player without a requirement of an additional wager. In a preferred embodiment, the games which the player is allowed to play may either comprise the base game, as described above, or may be another game, such as presented on the video display of the gaming machine or presented by other reels or the like. For example, the player may be permitted to play a video slot game presented on the display 38 of the gaming machine 20 illustrated in FIG. 1.

In a step S107, the outcomes of the one or more games are determined. If the outcome of one or more of the games is a winning outcome, the player is preferably awarded winnings. In a step S108, any winnings are preferably multiplied by the multiplier value which was assigned or generated previously. For example, if in a free spin game the player obtained a winning combination having a payout of 20 credits and the player had obtained a multiplier of 3, then the player would be entitled to 60 credits. In a step S109, those winnings are awarded to the player.

As will be appreciated, to keep the free spin games simple, it is preferred that those games not involve bonus events themselves, but simply define winning or losing events. In other embodiments, the game may be more complex, with the player provided the opportunity to play bonus and other events, including further opportunity for additional free spin games or the like.

In one embodiment, the multiplier value for the event may be posted to the player. For example, in the embodiment illustrated in FIG. 1, a multiplier value of 6× is shown. The multiplier value may be displayed by a display of the machine 20 after it has been generated as part of the event. Likewise, the number of credits won by the player as part of the outcome of a game may be displayed. For example, if the player received a winning result having a 9 credit win, as multiplied by the multiplier (6), the player would be entitled to 45 credits, as illustrated. Of course, a credit meter may show the total number of credits which belong to the player from their value input, and wins/losses from the play of all games, including the bonus spins.

Figure 5:
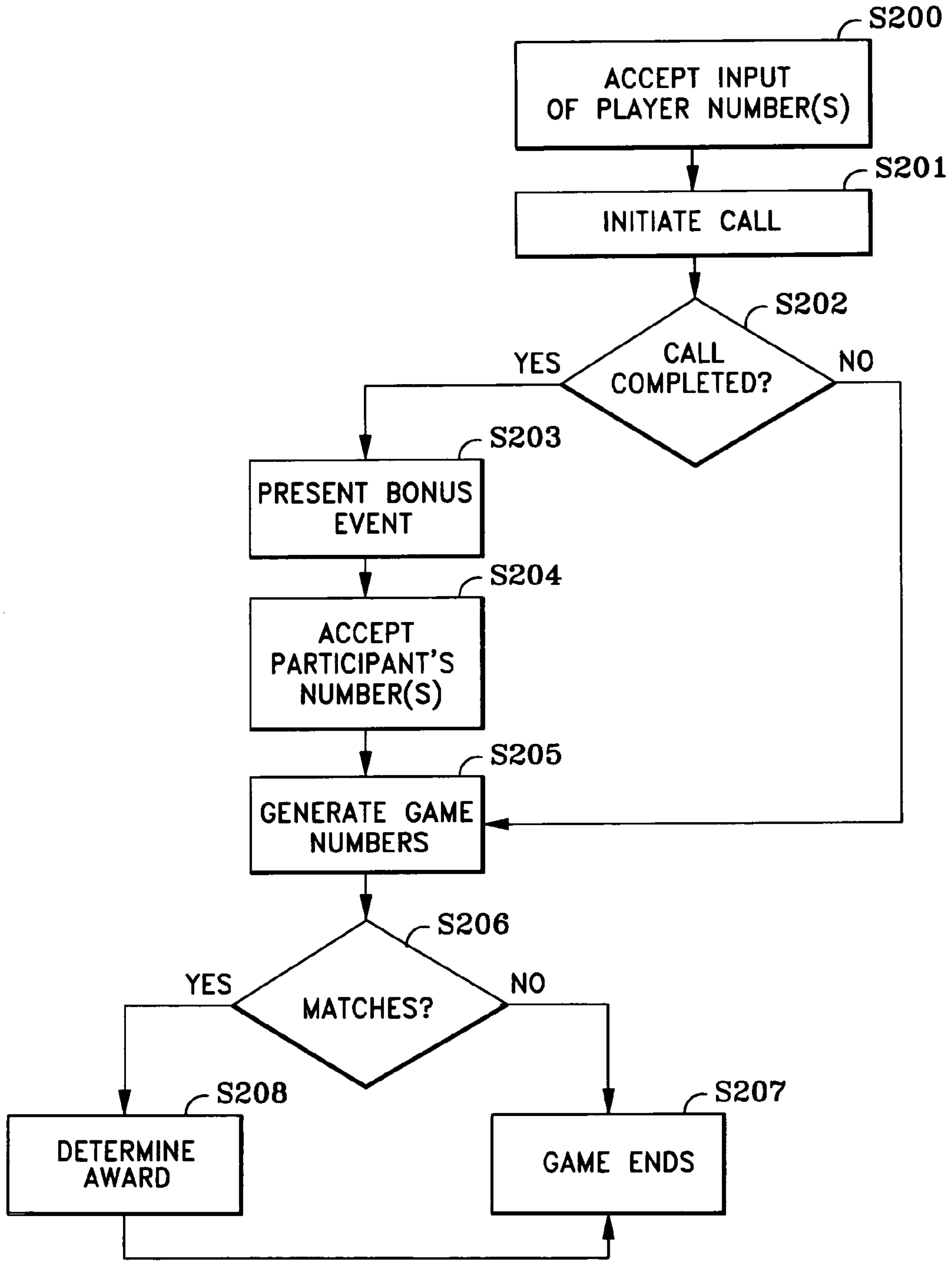
FIG. 5 is a flow-chart illustrating one embodiment of a third-party participant bonus event of the method illustrated in FIG. 4.

A participant bonus event in accordance with the invention will now be described in conjunction with FIG. 5. As indicated above, such a bonus event may be initiated based upon a player receiving a particular symbol or combination of symbols, as in step S11 of the method of game play illustrated in FIG. 3.

As one example, in the case of the symbol sets described above as used in the play of the base game, a set of any three "telephone" symbols on an active payline may initiate this bonus event. For reasons which will be apparent below, one embodiment of a bonus event may be referred to as "phone-a-friend".

Initiation of the event may be accompanied by a notification at the gaming machine. For example, lights and sounds, along with audible or text information, may be presented to the player to make them aware that this bonus event has been triggered and to add excitement to the game, including excitement to passers-by and other players.

Preferably, this event offers the player the opportunity to play a game with another player or participant. In one embodiment, the game involves the calling of another participant or player.

In a step S200, a player inputs a player number. Preferably, this player number is used in the play of the bonus event. In the case of the gaming machine 20 illustrated in FIG. 1, the numbers may be input into the keypad 44. In one embodiment, the player number is a 5 digit number (e.g. 33554).

In a step S201, a call is initiated to a third party participant. This call may be initiated in a variety of ways. In one embodiment, the player is permitted to input a telephone number of a person they wish to have participate. For example, a person may input the phone number for their wife, mother, father, brother, sister, friend or the like. The phone number may be input using the keypad 44 in response to a prompt to the player to input the number.

In another embodiment, the call may be placed to a person identified in a player tracking system. A gaming operator may permit players to provide identifying information, including their telephone number. This information may be used, in part, to track the player's game play and reward them with awards for their play. In accordance with this embodiment, the information may be used to identify them as a participant in the bonus event. The player information, including the telephone number information, may be stored at a server (such as server 50 of the system illustrated in FIG. 2). When this bonus event is initiated, the gaming machine may contact the server and request a telephone number from the database. A player/telephone number may be randomly selected from the database and then transmitted to the gaming machine for initiating the call.

In yet another embodiment, a telephone number may be randomly generated by the gaming machine, and that number may be dialed in an attempt to form a link with a participant.

In one embodiment, a player may be permitted to select the way the call is placed (by input of a number of their choice, selection from identified participants in the database, or by random selection). In another embodiment, the manner by which the call is placed may randomly selected, and thus change from game to game.

In these embodiments, the telephone number is preferably utilized in an attempt to form a communication link with a participant. In the case of the system illustrated in FIG. 2, the call may be placed from the gaming machine 20 to another telecommunication device, such as a wired telephone 54 or wireless telephone 56. Essentially, the gaming machine 20 acts as a telecommunication device, in similar fashion to a normal telephone, permitting calls to be placed to other authorized telecommunication devices.

In one embodiment, calls may be placed to only "local" or toll-free locations. In other embodiments, calls may be placed to certain areas or locations, and in yet other embodiments, there may be essentially no restrictions upon calls.

In yet another embodiment, the call may be to a player at another gaming machine. In this embodiment, a call may be placed from one machine to another, either directly or via the server 48 or other device. In this embodiment, the gaming machines 20 do not necessarily need a communication link "to the outside", but simply need to be able to communicate with one another. In one embodiment, the call may be placed to a randomly selected machine, and in another embodiment, only to a machine at which a player is currently identified as playing.

In a step S202 it is determined if the call is completed. Generally, this involves determining if the call has been answered. In a step S203, if the call is completed, then in a step S204, a bonus event may be initiated. The bonus event may have several purposes. First, the bonus event may confirm the call has been answered by a participant, and not an answering machine or the like. Second, the bonus event may be used to determine criteria for the game.

First, the bonus event may include a requirement that the participant identify themselves. For example, in the case of a player selected from a player club database, the player may be prompted to enter their password, i.d., or other information which identifies them. Preferably, the information which is requested is information which is stored in the database and can thus be used to confirm the identity of the player. The player may speak, enter via their telephone touch-pad or otherwise provide the requested information, which is then checked against that in the database. If the information does not match, the player may not be permitted to play.

In a preferred embodiment, any player may play. The bonus event comprises the participant making a selection as an answer to a question. For example, the bonus event may comprise asking a multiple-choice question having several answers. In one embodiment, no answer is wrong, but the selection of an answer corresponds to a multiplier or other bonus event value. For example, the player may be asked a question and then be presented with optional answers A, B, C, or D, or 1, 2, 3, or 4. The player may use their keypad or voice to make a selection of an answer.

In one embodiment, the bonus question is generated by the gaming machine, server or the like, and the information is transmitted to the participant over the telecommunication link once the call is answered. When the call is answered, the participant may also be played a greeting, such as "you have been selected to participate in the phone-a-friend game and you now have the opportunity to win thousands of dollars". In one embodiment, where the player is permitted to select the participant, the player may be permitted to identify themselves to their friend to entice them to play.

As indicated, in a preferred embodiment, each answer is associated with a bonus event value. In one embodiment, the value is a winning value multiplier, such as 2×, 4× or the like.

In a step S204 input is received regarding the participant's numbers. In similar fashion to the player's numbers, the participant is preferably permitted to select a lucky number, such as a five digit number. Of course, the participant number could include more or less digits than the player number.

In a step S205, game numbers are generated. Preferably, the game numbers comprise a first number the same size as the player's number, and a second number the same size as the participant's number. For example, if the player and participant numbers comprised five digit numbers, then so do the game numbers.

If the call is not completed or if the call is completed but the participant's identification is not confirmed, the game may continue without participation by the third party. In such event, the game preferably continues at step S205 as well, except that only one game number is generated corresponding to the player. Alternatively, other events may be presented to the player, including events which offer a much lower or smaller jackpot/winning.

In a step S206, it is determined if the player's number match the game numbers, and/or if the participant's numbers match the corresponding game numbers. For example, the first game number is compared to the player's number to see if they match. The second game number is compared to the participant's number to see if they match.

In a step S207, if neither sets of numbers matched, then the game preferably ends.

In a step S208, if either or both of the sets of numbers matched, then an award may be determined and be awarded. For example, in one embodiment, if just the player's number matched the corresponding game number, then the player may be awarded a monetary win, such as $1000.00. If only the participant's number matched the corresponding game number, then the participant may be awarded a monetary win, such as $1000.00. If both the player and participant numbers matched the corresponding numbers, then the player may be awarded a large jackpot award, such as $1,000,000.00, and the participant might not participate in an award.

Of course a variety of awards may be yielded as a result of matching numbers. In one embodiment, a player and/or a participant may be awarded a win if some but not all of the digits of their numbers matched the corresponding game numbers. For example, if the player selected 45897 and the game number for the player was 45896, the player might be awarded an award comprising some portion of the top award.

In one embodiment, the award which is paid to the player or participant (other than the jackpot award), may be multiplied by the multiplier value which was yielded as part of the participant's play (in step S203). For example, if the participant's numbers matched and the multiplier generated earlier was 2× then the player might be paid $2000.00 (i.e. 2×$1000.00).

Of course a variety of variations of the game are contemplated. Preferably, the bonus event includes the step of forming, or attempting to form, a communication link with a third party. However, the exact form of the game which is played in association with that event may vary. For example, where the third party participant is at another gaming machine, both gaming machines may immediately go into a bonus mode which presents to both players the opportunity to play a game of video poker against one another, or against the house, in an attempt to win a game. Alternatively, both players may be presented with a slot type game which they play in an attempt to obtain a winning result. A primary advantage, regardless of the particular type of game which is presented/played, is the possibility for, if not the actual participation of, the third party with the player in the event. As described below, this adds a great dimension of excitement to the game.

As one aspect of the bonus event, rules or laws may permit participation of only players of certain ages or in certain geographic locations. Part of the play of the event may require confirmation that the participant is eligible to participate. In the case of participants who are selected from a player club database, as indicated above, the confirmation of the identity of the participant may be sufficient (and where the eligibility of the participant to play is confirm at the time they sign up to participate). In other embodiments, additional information may be obtained to confirm eligibility.

A secondary bonus event in accordance with the invention will now be described in conjunction with FIG. 6. As indicated above, such a bonus event may be initiated based upon a player receiving a particular symbol or combination of symbols, as in step S14 of the method of game play illustrated in FIG. 3.

As one example, in the case of the symbol sets described above as used in the play of the base game, a set of any three "slot-a-thon" symbols on an active payline may initiate this bonus event. Once again, when this bonus event is activated, audible and/or visible information of such may be presented to the player to make them aware of the event and to add excitement to the game.

Figure 6:
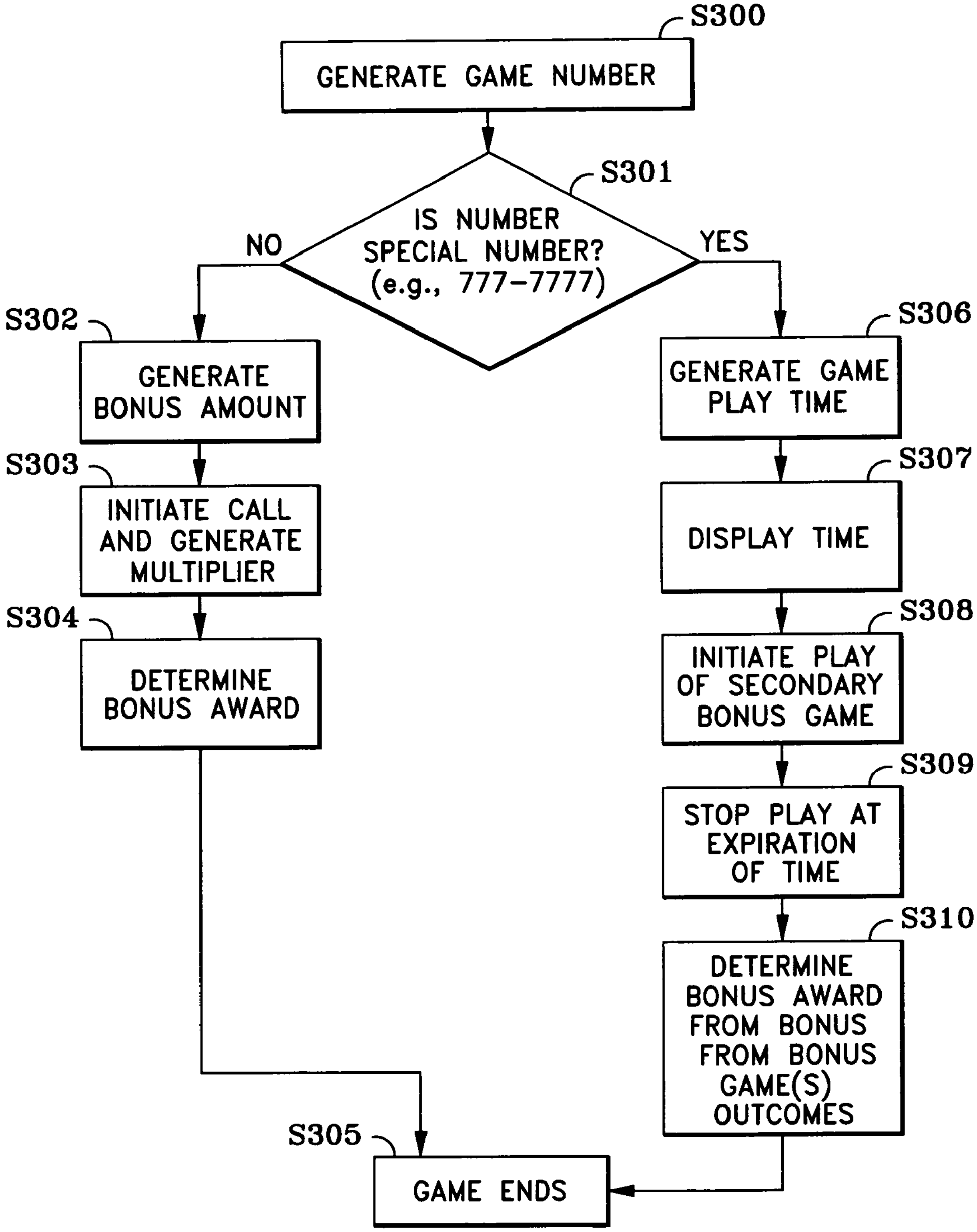
FIG. 6 is a flow-chart illustrating one embodiment of a secondary bonus event of the method illustrated in FIG. 4.

In one embodiment, the bonus event initiates with the generation and display of a game number, as in step S300 of FIG. 6. In one embodiment, the game number is a 7 digit number which is randomly generated. The game number is preferably displayed by the gaming machine, such as using the video display 38 thereof. In one embodiment, the number is displayed as the result of the simulated spin of seven (7) video reels each having a single position. In one embodiment, the "spinning" of the video reels is initiated by the player, such as by the player using the "spin" button 28 of the gaming machine.

In a step S301 it is determined if the generated number is a predetermined number, such as 777-7777. If not, then the bonus event continues in a step S304, the game number is utilized to create a bonus amount. In one embodiment, the digits of the number are added to create a value. For example, the game number 555-1212=21. This value would be assigned as a bonus value in the bonus event. In one embodiment, the bonus value is posted to the player, such as by display on the video display or other display of the gaming machine.

In a step S303, the player is preferably provided the opportunity to increase the size of the bonus value. In one embodiment, the player plays for a multiplier value.

In one embodiment, the event is configured as a telephone call. Various events may be utilized to determine the multiplier value, such as a number of rings (in similar fashion to that described above), or the player might place a call to third party (either via a number of their choice or a pre-selected number, as described above) and the third party might answer a question having answers with associated multiplier values, or a call might be initiated to a player of another gaming machine who then engages in an event, such as the selection of a number or other event. Multiplier values might be displayed by the gaming machine and the player might utilize the telephone to stop a pointer or the like upon a particular value (such as by the player lifting the handset, dialing a number, pushing a button or the like). Of course, other events might be utilized to determine the multiplier value. It is preferred, however, that the event be a telecommunication-related event, as that substantially increases the excitement of the game.

Based upon the outcome of the event, the multiplier value is determined. In a step S304 the total bonus event award is determined. For example, if the player's starting bonus value was 21 and they obtained a multiplier value of 5×, the player would win 105 credits/coins or other value. That winning would preferably be awarded to the player, such as in the form of credits at the gaming machine. In a step S305, the game then ends.

In step S301 if it was determined that the game number comprised the special or particular number, then a different event is preferably presented to the player. In one embodiment, the player is provided the opportunity to play a special game for the opportunity for winnings. Preferably, the player is allowed to play the game with no additional wager necessary.

In one embodiment, in a step S306, a game play time is initiated. In one embodiment, the game play time may be fixed. In other embodiments it may be randomly selected or determined through some secondary event. Preferably, the total time of the event and the time remaining in the event are displayed to the player, as in step S307. In the case of an embodiment of a gaming machine, such as illustrated in FIG. 1, the gaming machine 20 may include a timer 60. The timer 60 may be a digital display, mechanical timer or the like. As illustrated, the timer is located in atop box portion of the gaming machine, but is could be located elsewhere. In addition, the time information could simply be displayed on another display (such as display 38) of the gaming machine.

Preferably, the event starts at a step S308, with the timer displaying remaining time as the time of the event expires. In one embodiment, the event is the play of a video slot game presented on a display of the gaming machine, such as display 38 of the gaming machine 20 illustrated in FIG. 1.

For example, the game may comprise a five (5) reel, nine (9) payline video slot machine which traditional symbols. Such games are well known in the art. Preferably, during the active time period, the player may press the "spin" button to initiate the game. The outcome of each spin is determined to see if the result was a win or loss. Preferably, certain symbols or combinations thereof when occurring along one of the paylines, is deemed a winning combination, as is known in the art. In one embodiment, at least one set of symbols along a payline results in the award of a jackpot amount, such as $1,000,000.00. For example, one set of symbols on the reels may comprise "Slot-A-Thon" symbols, and a set of those symbols on all reels along a payline, may trigger the jackpot winning amount.

Game play ends in a step S309 when the time expires. In a step S310, the total bonus award is determined and awarded to the player. For example, a player might play 14 games, with 5 of the games yielding winning combinations with associated winning values of 10, 100, 400, 5 and 20, for a total winning of 535 during the event. After the bonus award is paid to the player, the game ends in step S310.

Of course, the invention may have various forms and configurations. The base game of the invention may have a variety of other forms than as described above. The base game could comprise a video slot game, and could even comprise other games such as video poker, electronic bingo or the like.

The game of the invention need not include all of the game play variations described. For example, the game may only include the base game and one of the bonus events, such as either a free spin bonus or participant bonus.

In one embodiment, the bonus events of the invention may be configured as stand-alone games or base games themselves having bonus events. For example, the participant bonus could itself comprise a base game. In one such configuration, a player might be required to place a wager, and would then be allowed to input their player numbers and attempt to call a participant.

The games of the invention may be presented at a variety of gaming machines or systems other than that described in conjunction with FIGS. 1 and 2. For example, the games could be presented in a mobile gaming environment, such as on cellular phones. For example, a player might utilize their cellular phone to communicate with a game server. In the event a base game is a winning event triggering a participant bonus, the server or player might be permitted to call another participant (for example, the server might place the call and link the player and participant in "conference" call type fashion).

In another embodiment, the games of the invention may be implemented in an on-line format, such as from home or work computers. Once again, the player may connect to a server gaming device, such as over the Internet. Game play may then proceed as described.

In these latter embodiments, it will be appreciated that software or game code may be required to be installed or loaded onto the device to enable play of the game. Such software may be downloaded to those devices or be permanently loaded into a memory thereof when they are manufactured or the like.

In one embodiment, the games of the invention may be played as "skill" games. For example, a player may or may not be required to place a wager. The player may then play for points. A player obtaining certain numbers of points (or a participant who does so via the participant portion of the game) may be entitled to prizes, such as gift certificates and goods. Such a variation of the game has particular applicability to on-line and wireless environment presentations.

As indicated, the gaming machine or other device which is utilized to present the game is or includes a telecommunication device. As described above, in one embodiment a gaming machine may incorporate such a device. The device may include a handset, speaker-phone, headset or other device for transmitting audible information to the player and permitting the player to answer and/or initiate calls. Of course a wide variety of other devices may be utilized. A gaming machine might include a wireless or "hand-held" phone unit, rather than a wired handset. In one embodiment, as indicated, the telecommunication device may be entirely "internal" to the machine. The image of a telephone or the like may be displayed when a call is to be placed or is incoming and needs to be answered. The player may utilize buttons or other inputs to answer and place calls.

As also indicate, the gaming machine or other device via which the game is presented may vary. As indicated, the machine may have a traditional "gaming machine" style or configuration. The various methods, including the games, may be presented in other environments, such as in a distributed environment. For example, the games may be implemented as "Internet" games. In one embodiment, a player may contact a game host, such as via computer via a communication link such as the Internet.

In one embodiment communication with the third party participant may take other forms. For example, in an "Internet" or similar environment, calls may be effected via the Internet, such as by a standard telecommunication-type call to a telephone or another party's computer, and by other means, such as an Instant Messenger™ message, email message or the like, by which a third party may participate.

In one embodiment, various aspects of the invention may be implemented as an additional system or device to an existing gaming machine. For example, a gaming machine may be configured to present a main or base game. A communication device may be associated with the gaming machine, but not be directly integrated therewith. For example, a communication device may include a display, handset or the like which is physically associated with (connected or mounted thereto, or located proximate the machine), that device forming a part of a "bonus system," such as by being connected to a bonus server which communicates with the gaming machine. In this configuration, a bonus "system" is essentially associated with a generally separate gaming system including gaming machines.

It will be appreciated that the odds of obtaining winning combinations of the main or base game, the odds of triggering a bonus event, the odds or winning a bonus event, and the payouts, may vary. In one embodiment, the wager or bet which is placed is used to fund payouts for all portions of the game. Thus, the total payout for the base game may be relatively low, in order to fund large jackpots for the bonus/secondary events.

In one embodiment, participation in the bonus events, or at least the opportunity to win jackpots, may be tied to the player's placing a large or maximum bet. In one embodiment, the largest jackpots or awards may be configured as progressive awards. In such an arrangement, the size of the jackpot grows (based on bets placed at one or more machines) between periods when it is won. The jackpot may have a minimum funding amount, or may drop to zero when won.

The game could involve the play of more than one participant. For example, the game could be configured so that more than one third party participant is called and may participate in the game. In another embodiment multiple opportunities may be provided to form a call with a participant. For example, if a player enters their friends phone number and the call is not answered, the player may be provided one or more additional opportunities to place additional calls, or the gaming machine may similarly be configured to attempt to complete such a call.

It will be appreciated that the methods of the invention are exemplary and the various steps may be changed, including their order. For example, instead of determining the results of a set of games in a free spin bonus, the result of each game are essentially determined or known at the end of each game. Further, various of the features of the various bonus events may apply to one another or be incorporated therein, or be incorporated in entirely different games.

The gaming machine, system and games of the invention have a number of advantages.

One aspect of the invention is a game, and more particularly a wagering type gaming offering the chance for monetary winnings, which has the opportunity to involve a participant. This aspect of the game adds significant excitement to the game. First, the player may be offered the opportunity to select their "friend" to play the game, building comradery and the like. Second, the player does not known if the call will be completed. If completed, the player and participant engage in a bonus event providing them an opportunity for significant winnings.

Another aspect of the game is a game which includes telephone or telecommunication calls to or from the player. The use of a telephone or telecommunication link adds excitement and a new dimension to game play, which traditionally relies upon simple viewing of the gaming machine itself. In the games of the invention, the player must interact with the gaming machine to place and/or answer the telephone/calls.

As indicated, in one embodiment, the possible participant in the bonus game may be selected from a player club database. One aspect of the invention is thus a system including a database of player information including player telephone numbers. In one embodiment, the database may include additional information such as player identification information for player verification purposes. As part of the system, players who sign up for the club are randomly selected (or their telephone numbers are), entitling them a chance to participate in the game.

In this regard, players are enticed to sign up for the player club for the opportunity to participate in the game. As is known, casinos and other entities find very valuable the ability to identify and track players, as such is a marketing tool which they can utilize to attract and keep players. In accordance with the invention, a valuable means is provided to entice players to sign up for the club.

In an embodiment where the game involves calling a player of another gaming machine, participation in the club/tracking system may be further enhanced where only players who are "logged in" may be identified as potential participants in the game.

Another embodiment of the invention is a game which offers a plurality of different bonus or secondary events. Because of the variety of bonus events, the play of the game is not repetitive, and instead remains exciting to the player.

Another aspect of the game is that, even aside from the participant bonus, the game (including bonus or second events), offer a great deal of player participation. For example, compared to a simple wheel spin as a bonus event, the bonus events of the invention involve answering calls, making decisions regarding when to answer calls, playing games during time periods, and making number selections.

One aspect of the invention is the ability to involve a participant regardless of their location. The game offers the ability of a participant to play via a cellular phone, land line or other telecommunication link (including computer telecommunication link, such as the Internet), essentially enabling them to be anywhere to participate in the game.

Various of the features of the invention have been described as “bonus events.” The events are referred to as a“bonus event” primarily because they offer play and/or a win opportunity which differs from the base game or event itself. However, the bonus events may be considered in one or more embodiments as essentially being a part of the base event, but just comprising one of the potential variations of game play of the base game or event, rather than events separate therefrom, since in a preferred embodiment the bonus events are triggered by outcomes of the play of the bonus event.

One aspect of the invention is a timed gaming event. In a preferred embodiment described above, the timed gaming event comprises a bonus event having a defined duration, that bonus event comprising the play of one or more games without a wager.

The invention may comprise other timed gaming events, however. The timed gaming events of the event may comprise “base,” “bonus” or other types of games, and may comprise a portion of a game. For example, the timed gaming event may comprise an entire gaming event, may comprise only a portion or duration of a gaming event (whether comprising one or more individual games) including a portion of a bonus or secondary event of a main gaming event, or may comprise an event which is associated with a gaming event (such as a bonus event associated with a main game event).

When associated with another event, the timed gaming event may be triggered or initiated based on several criteria. For example, as indicated above, the timed gaming event may be initiated based upon a particular base game outcome. The timed gaming event may also be randomly assigned or initiated, as in a ‘mystery’ format, where players do not know when or to whom the timed gaming event may be awarded. The timed gaming event might also be initiated based upon a player’s reaching a particular level of play, such as based upon wagers, number of games or the like.

In one embodiment, once a timed gaming event is declared, a player may be required to initiate the event. For example, a time gaming event may be declared or announced, and the player may be required to place a wager, press a button or provide other input in order to initiate the event. If the player does not initiate the event, then the opportunity to participate in the timed gaming event may be lost. For example, a timed gaming event may be randomly declared at a machine and announced to the player with a flashing message. The player may be instructed to place an additional wager or press a “spin” button to start the event. If the player does not do so within a period of time, the timed gaming event opportunity may pass.

The types of games or events with which the timed gaming event may be associated or which the timed gaming event may comprise may vary and include slot-type games (including any number of mechanical and/or video-simulated reels with any number of paylines), poker, dice (such as craps), roulette and other games now known or later developed. For example, the timed gaming event may comprise slot games or hands of video poker.

Preferably, the timed gaming event of the invention comprises an event which occurs or is enabled for play during a particular time interval. This time interval has a start time and an end time. The duration of the timed gaming event may be fixed, or might vary, such as randomly or based upon various criteria. Preferably, the duration of the timed gaming event is independent of game play, including results of games played at the gaming machine(s). Preferably, for example, the event time is randomly or otherwise selected, and is not determined by particular game outcomes or player actions. In one embodiment, the period of time may not run until the player provides input in the case where a player input is required. For example, if timed gaming event is declared and a player is required to place a wager or press a spin or deal button to start the event, the time period may begin to run only once such action is taken by the player.

As indicated, in one embodiment, the timed gaming event defines a duration of time during which a player may play one or more games without payment of a wager. In another embodiment, the timed gaming event may define a duration of time during which other activities may be enabled or occur, including activities which require a player to place a wager in order to participate. For example, in one embodiment, the timed gaming event may comprise a duration of time during which a player or players must place wagers in order to play games, but the amount of the wager(s) is reduced. For example, normally a player must place a maximum coin bet in order to obtain the highest possible payback for winning results. During a timed gaming event, a player may be permitted to place a smaller wager, such as a minimum single coin bet, but still have the opportunity to win higher or highest payouts for games played. In another variation, during a timed gaming event a player is required to place a wager to play one or more games, but the payout for winning results is increased over the normal payout for winning results. For example, payouts for winning results of games played during a timed gaming event may be subject to a multiplier, such as 2×, 3×, or more of the normal payout. Alternatively, additional winnings such as associated with an “enhanced” paytable may be paid. These features may also apply where the player is not required to place a wager. For example, during a timed gaming event the player may not be required to place a wager and may be entitled to enhanced winnings, such as via a multiplier or enhanced paytable, as compared to normal game play.

In another embodiment, the timed gaming event may involve more than one gaming machine and/or more than one player. For example, a plurality of players may participate in a timed gaming event at the same time, whether playing different games or participating in a group game, such as a tournament. A plurality of gaming machines may be associated with a timed event in such instances.

Several specific examples of preferred variations of timed gaming events will now be described in greater detail. As indicated above, one embodiment of a timed bonus event defines a time period during which one or more players are permitted to play games without placing a wager, but still offering the players winnings for winning outcomes of the games played during the duration of the event.

In one embodiment, a timed gaming event defines a duration of time during which enhanced payouts are awarded. The timed gaming event may be associated with a single gaming machine or a group of two or more gaming machines. During the event, payouts for winning outcomes for games played by players may be enhanced, such as subject to a multiplier or other increase. Each player of a machine subject to the timed gaming event preferably places a wager to play one or more games, such as by way of monies, credits or comps (such as use of player points). The outcome of one or more of the games played during the timed gaming event are preferably subject to the enhanced winnings.

Figure 7:
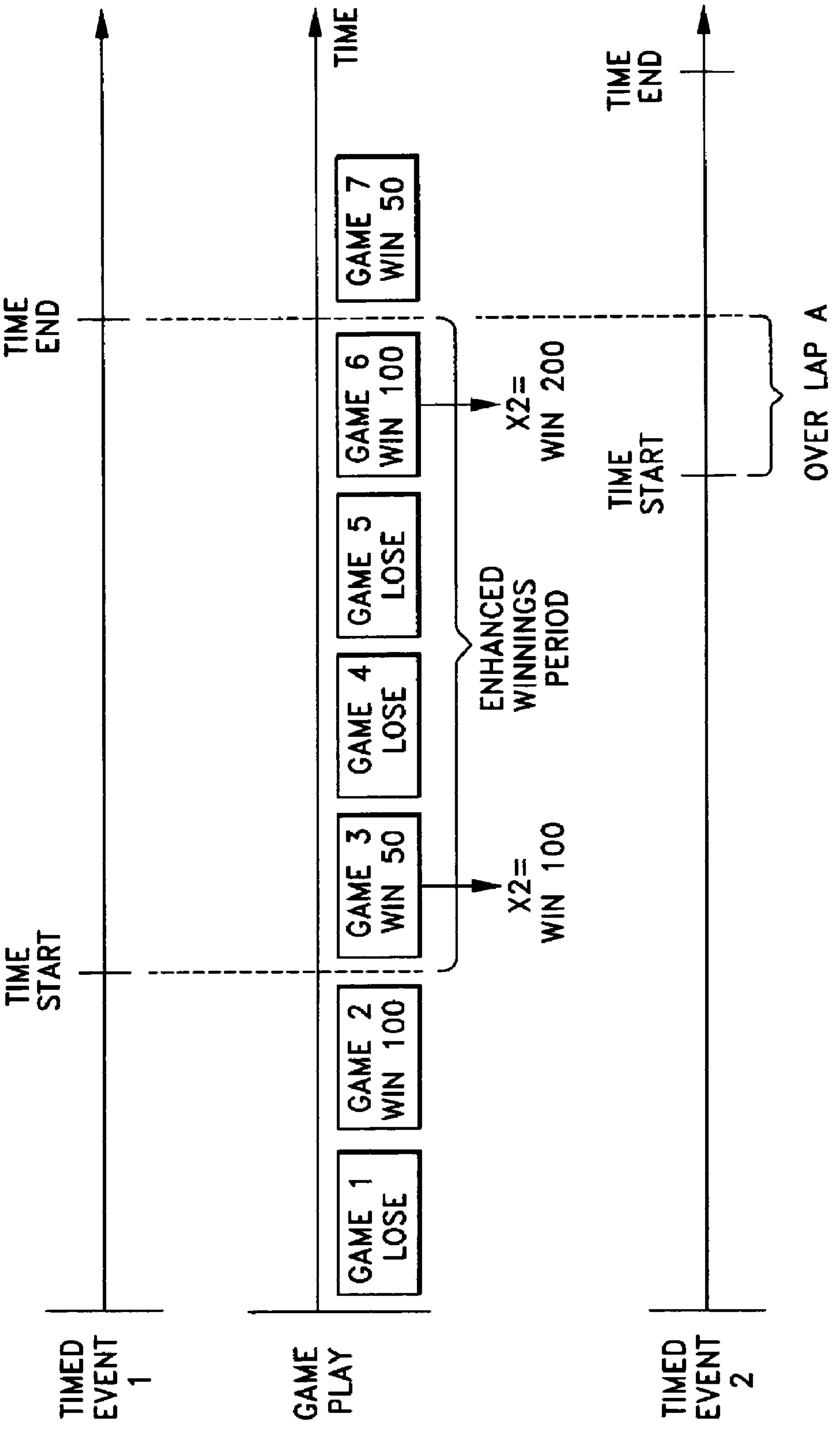
FIG. 7 illustrates one embodiment of a timed gaming event in accordance with the invention.

FIG. 7 illustrates one such embodiment of the invention. As illustrated, a player is playing a gaming machine. After playing a Game 1 and a Game 2, a timed gaming event comprising an enhanced award time period is initiated. During that time period, the player plays Games 3, 4, 5, and 6. As illustrated, for winning outcomes of Games 3 and 6 during that time period, the player’s winning payouts are enhanced by a 2× multiplier. After the timed event ends, the player's winnings for Game 7 remain the normal payout (and are not enhanced).

In one embodiment, a timed gaming event may comprise a tournament type event. Players of two or more machines play one or more games for outcomes. In one embodiment, players of two or more machines play a plurality of games during a timed period. The player with the highest winnings for games played during the time period is declared the winner and is awarded a payout, such as their actual winnings and/or enhanced winnings, such as including a tournament win bonus. In one embodiment, the timed event is run as a tournament where players play dedicated machines, with the machines activated at the start of the timed tournament event. In another embodiment, the tournament could be applied to existing machines where play is already occurring. For example, a plurality of players may play a plurality of gaming machines. At a particular time or times, a tournament may be announced to the players of those machines, the tournament "overlapping" with their existing game play.

Figure 8:
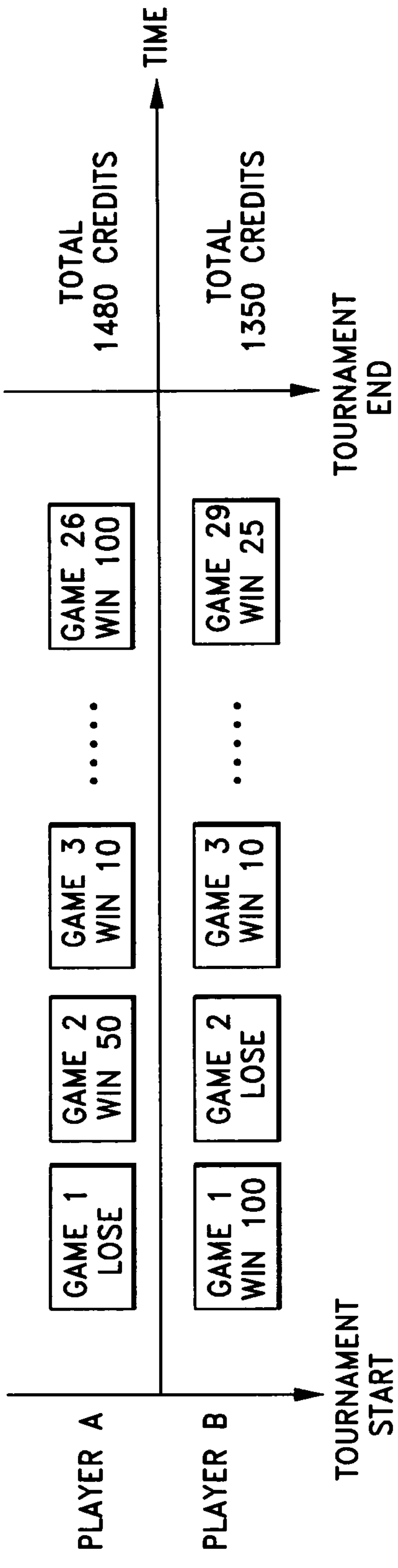
FIG. 8 illustrates a timed tournament type gaming event in accordance with the invention.

FIG. 8 illustrates one example of such a tournament. As illustrated, during the timed event tournament period, at least two players (Players A an B as illustrated in FIG. 8) play a plurality of games. The outcome for each game is determined, such as a "loss" or a "win" having an associated payout. The outcome of the event for each player is determined, such as the total win or credits for winning outcomes for games played by the player. The winner or winners of the timed event may then be determined from each individual player's outcome. In the example illustrated, if the winner of the tournament is the player having the highest aggregated win value, then Player A may be declared the winner of the event. All players may be paid their actual winnings, or only the winner(s) may be paid winnings, whether a tournament prize and/or such a prize and the actual win.

Of course, the tournament may have a variety of features. For example, the player having the greatest "loss" for games played during the timed period or other criteria may be used to determine the outcome of the event. Preferably, however, the event comprises the play of multiple games during a time period which has a start and an end defined by a time duration, and the outcome of the event is determined at least in part based upon each player's own aggregated play during the time period.

Figure 9:
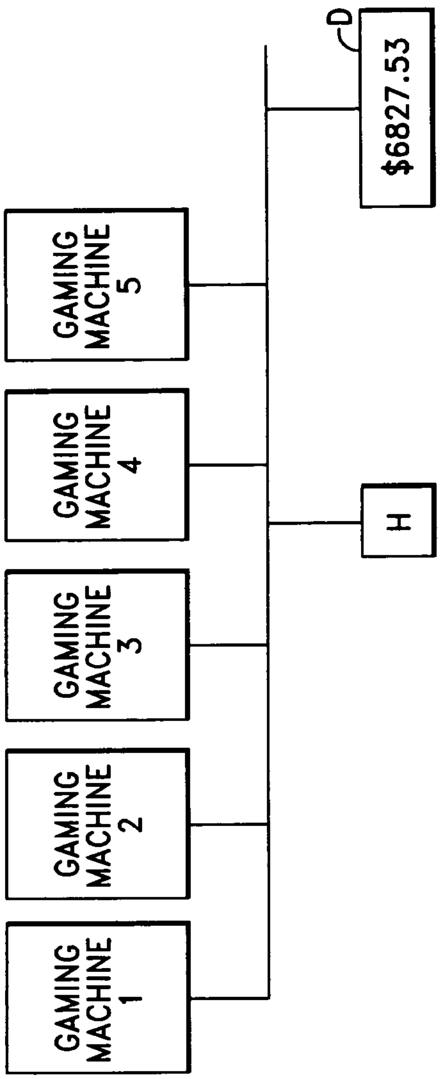
FIG. 9 illustrates a system for presenting a timed gaming event in accordance with an embodiment of the invention.

In one embodiment, the machines associated with the timed gaming event are linked or associated with a central event server. In the case of the tournament, for example, a central event server may automatically track winnings and losses of the multiple players so that at the end of the event the winner can be automatically declared and winnings credited directly to their machine. FIG. 9 illustrates one embodiment of a system comprising a central host H which communicates with a plurality of gaming machines GM1, GM2, etc. In such an embodiment, the timed gaming event may be triggered or initiated from the central event server. In other embodiments, the event could be triggered directly at the machine.

In one embodiment, players may play for a "progressive" tournament award. For example, a portion of wagers at one or more machines or associated with the play of one or more games may be assigned to a pool. When the tournament timed event is played, the players may play for all or a portion of that pool. Likewise, such a pool may be associated with a single gaming machine and a player of the machine may play to win all or a portion of the "machine" pool when an enhanced winnings timed event is declared at that machine. As illustrated in FIG. 9, the tournament award may be posted at one or more times to players, such as by the host H transmitting award value information to a display D.

The timed gaming events may have a variety of configurations and implementations. In one embodiment, a plurality of timed gaming events may occur simultaneously. For example, a timed event may be declared during which all winning outcomes at the machine are subject to a 2× bonus payout. Before that timed event concludes, another timed event may be initiated. FIG. 7 illustrates one such embodiment in which a second timed event has been initiated before the conclusion of a first timed event, resulting in two timed events overlapping for time duration A.

In one embodiment, only games which are initiated after the start of the timed gaming event and which conclude before the end of the timed gaming event comprise part of the timed gaming event (such as for determining the game outcomes subject to a tournament score or enhanced payouts). In another embodiment, if a game is in play when the timed event starts or ends, then that game is considered to be part of the timed event.

Several additional embodiments of timed gaming events will now be described in conjunction with the above-described game of the invention. It will be appreciated, however, that these events and various features thereof have applicability to other games.

Figure 4:
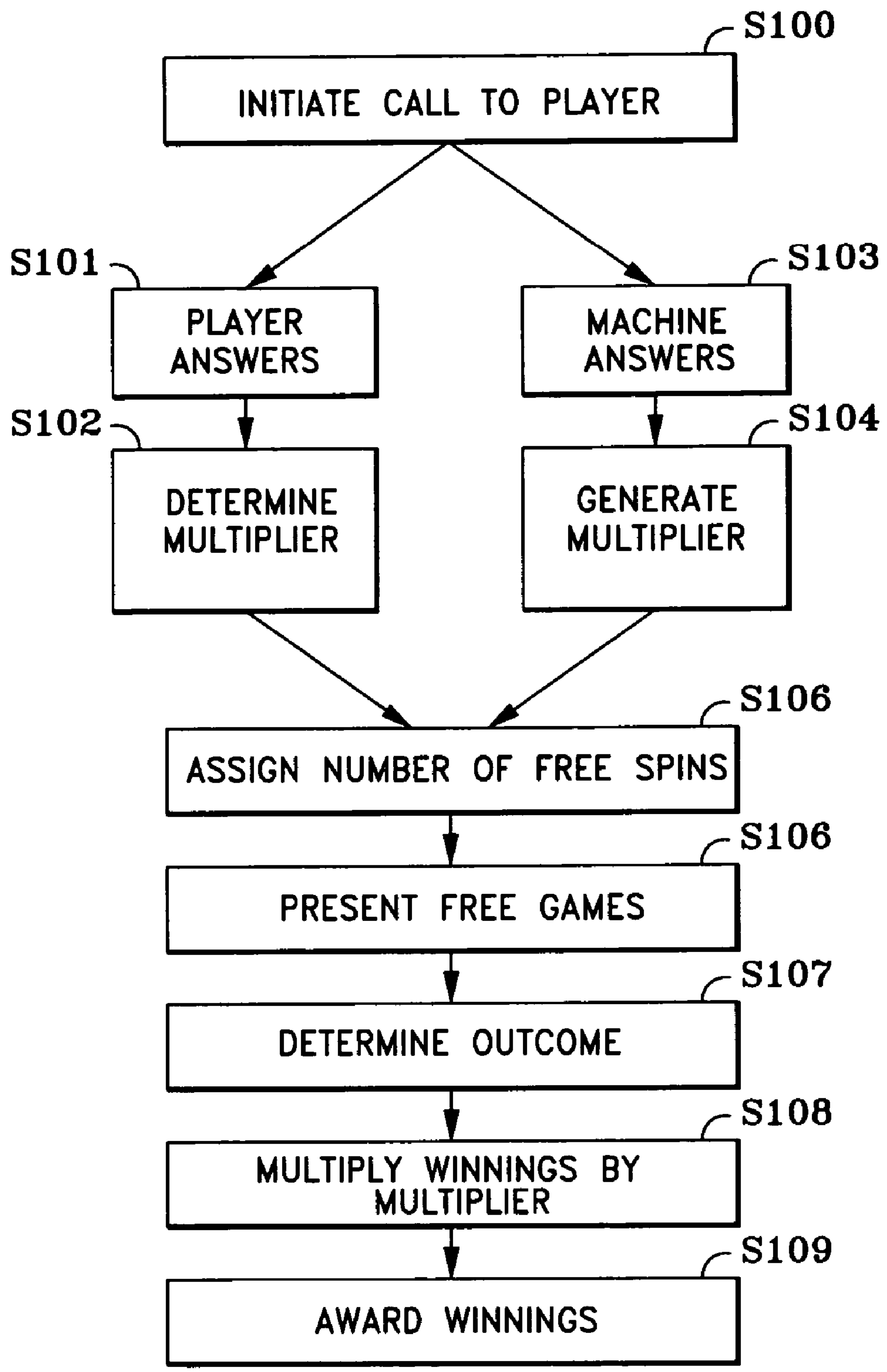
FIG. 4 is a flow-chart illustrating one embodiment of a bonus spin event of the method illustrated in FIG. 3.

As described above and illustrated in FIG. 3, in one embodiment of a game of the invention a player may be awarded a "free spin" bonus event, as illustrated in FIG. 4. In another embodiment of the game, the event may be a tournament type timed gaming event. In one embodiment, if the player receives a particular outcome playing the base game, such as five "Slot-A-Thon" symbols scattered anywhere within the displayed symbols of a base slot game, the bonus event may be initiated. The player may be instructed to select one of those symbols or a symbol from a different set of symbols. Selection of a symbol by the player reveals the time period for a timed gaming event. For example, the player may be eligible to receive a time period of play of 30, 45, 60, 75 or 90 seconds.

Once the time period of the timed gaming event is determined, the player may be permitted to play as many bonus games as possible during the time period. These games may comprise, for example, slot games. The player is preferably required to place a wager to play each game, and is awarded winnings for winning outcomes of the game.

In addition, in one embodiment, the player may be awarded an award based upon the results of their games during the timed period. For example, the player may be awarded a bonus if their total winnings for games played during the timed gaming event reach particular monetary levels. The player might play, for example, for first, second and third place prizes, the prize amounts varying depending upon the size of the wager. Progressive awards could also be awarded.

In one embodiment, the player plays for a particular level of winnings, or alternatively points or the like, to reach thresholds. In another embodiment, the player may play against other players. For example, if the event is triggered at one machine, it may selectively be opened for play at one or more associated machines, with the players of the machines playing against one another, such as for the highest monetary amounts or points.

As also described above, in one embodiment of the game a player may be awarded a free game bonus period. In another embodiment, the player may instead be awarded other types of events. For example, the symbols or indicia used in play of the base game may include "Bonus Time Clocks." If a player receives a particular number or pattern of these symbols, such as these symbols scattered anywhere on reels 1, 3 and 5 of a five (5) reel machine, then the timed bonus event may be awarded.

In one embodiment, the player may then be offered the chance to play as many games as possible during a set time period, such as 60 (sixty) seconds, as possible. During this time period, the player may be required to place a wager to play the games and may be offered an enhanced payout, such as 2× all wins for base game outcomes (in one embodiment, during games of the timed bonus event, where the game played is a slot-type game which is the same as the base game, no other bonus events may be triggered or initiated).

In one embodiment, the maximum wager a player can wager upon games during the timed gaming event is limited to the size of the wager the player made to play the game which resulted in the winning outcome which triggered the timed gaming event. For example, if the player placed a wager of 2 (two) coins or credits to play the base game and the timed gaming event was triggered, then the maximum bet the player could place upon games during the timed gaming event would be 2 (two) credits.

In one embodiment, if the player runs out of credits during a timed gaming event which requires the player to place wagers to play games, the player may be permitted to "pause" and "restart" the game in order to provide additional monies to the gaming machine.

In various embodiments of timed gaming events, the speed of game play may be altered. For example, during a timed gaming event, the number of games which are presented during a period of timed or the length of time of the presentation of a game, may be altered or controlled by the gaming machine. For example, during a timed gaming event comprising slot type games, the length of time that the reels spin before stopping (whether physical or virtual reels) may be increased, thus reducing the number of games that can be played in a particular period of time.

The games of the invention may include an "auto play" feature. If a player activates this feature (or doesn't turn it off, when that feature is the default play configuration), the gaming machine may be configured to place the maximum wager for the player and initiated games automatically, without the player having to place wagers and initiate games (such as by hitting the "spin" button). This feature may be used by a player to ensure maximum play speed of games during a timed gaming event.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting games at a gaming machine comprising the machine implemented steps of:

accepting a wager;

presenting a wagering game based upon said wager, said wagering game having a plurality of possible outcomes, one or more of which are winning outcomes having an associated award;

determining if said wagering game occurs between a start time and an end time of a defined timed gaming event which is randomly initiated during game play, independent of player initiation and independent of the game outcomes; and determining if said wagering game does not occur during any timed gaming event, wherein if said wagering game does not occur during any timed gaming event and said outcome is a winning outcome, awarding a base award for said winning outcome, and if said wagering game occurs during said timed gaming event and said outcome is a winning outcome, awarding an enhanced value award for said winning outcome that is a multiplier of said base award for said winning outcome.

2. The method in accordance with claim 1 further comprising the step of displaying a time remaining in said time period of said timed gaming event.

3. The method in accordance with claim 2 wherein said step of displaying comprises displaying a remaining time with a timer.

4. The method in accordance with claim 1 wherein said enhanced value award comprises 2 or more times the base award for each winning outcome.

5. A method of presenting games at a gaming machine comprising the machine implemented steps of:

presenting at least one wagering game to a player, each wagering game having a plurality of possible outcomes, one or more of which are winning outcomes having an associated award;

randomly initiating, during game play, independent of player initiation and independent of the game outcomes, a timed gaming event, said event having a start time and an end time and said event not being initiated within another timed gaming event;

determining if said player is eligible to participate in the play of one or more games during said timed gaming event by determining if said player is playing at least one wagering game when said timed gaming event is initiated;

if said player is eligible to participate in the play of one or more games during said timed gaming event, presenting one or more games to said player during said timed gaming event; and as to said wagering games that are presented outside of any initiated timed gaming event, awarding a base award for winning outcomes of said wagering games; and as to wagering games that are presented during said timed gaming event, awarding an enhanced award for winning outcomes, which enhanced award is greater than said base award for said outcomes.

6. The method in accordance with claim 5 wherein said gaming machine is part of a gaming system including a game server communicatively coupled to said gaming machine and wherein said step of randomly initiating said timed gaming event comprises transmission of a signal from said game server to said gaming machine.

7. The method in accordance with claim 6 wherein said gaming system includes multiple gaming machines and said timed gaming event is initiated only as to gaming machines in active play when said initiating occurs.

8. The method in accordance with claim 5 wherein said gaming system includes multiple gaming machines and said initiating occurs in response to a particular game outcome received at a gaming machine of said gaming system.

9. The method in accordance with claim 5 further comprising the step of accepting from a player a wager for each game presented, whether said game is or is not presented during said timed gaming event.

10. A method of presenting games at a gaming machine comprising the machine implemented steps of:

presenting at least one base wagering game to a player outside of any initiated enhanced award period, said at least one base wagering game having a plurality of possible outcomes, one or more of which are winning outcomes having an associated base award;

determining said outcomes of said at least one base wagering game and awarding said associated base awards for winning outcomes;

randomly initiating, during game play, independent of player initiation and independent of the game outcomes, an enhanced award period and said enhanced award period not being initiated within another enhanced award period;

determining if said player qualifies to play one or more games during said enhanced award period by determining if said player is actively playing one or more base wagering games when said enhanced award period is initiated;

if said player qualifies to play one or more games during said enhanced award period, presenting at least one wagering game during said enhanced award period, wherein winning outcomes for said wagering games presented during said enhanced award period have an associated enhanced award which is greater than said base award when said wagering game is presented as a base wagering game; and determining said outcomes of said at least one additional wagering game and awarding said enhanced awards for said winning outcomes.

11. The method in accordance with claim 10 further comprising the step of ending said enhanced award period and presenting one or more base wagering games having associated base awards.

12. The method in accordance with claim 10 further comprising the step of accepting a wager for each base wagering game and each additional wagering game.

13. A method of presenting games at a gaming machine comprising the machine implemented steps of:

presenting one or more games in a normal game play mode, each game comprising:

accepting a wager from a player;

presenting game information to a player;

determining an outcome of said game; and if said outcome of said game is a winning outcome, awarding a base award for said winning outcome;

randomly initiating, during game play, independent of player initiation and independent of the game outcomes, a timed gaming event during which one or more games may be presented, said timed gaming event having a bonus time period extending from a start time to an end time, said timed gaming event not being initiated within another timed gaming event;

determining if said player is eligible to participate in said timed gaming event; and if said player is eligible to participate in said timed gaming event, presenting one or more games during said bonus time period and awarding an enhanced award for winning outcomes of said games, said enhanced awards comprising a multiplier of said base awards for said corresponding winning outcome during said normal game play mode; and if said player is ineligible to participate in said timed gaming event, continuing to present games in said normal game play mode outside of any initiated timed gaming event.

* * * * *